May 6, 1941.   A. BOUCHARD ET AL   2,240,753
MEASURING DEVICE
Filed April 12, 1940
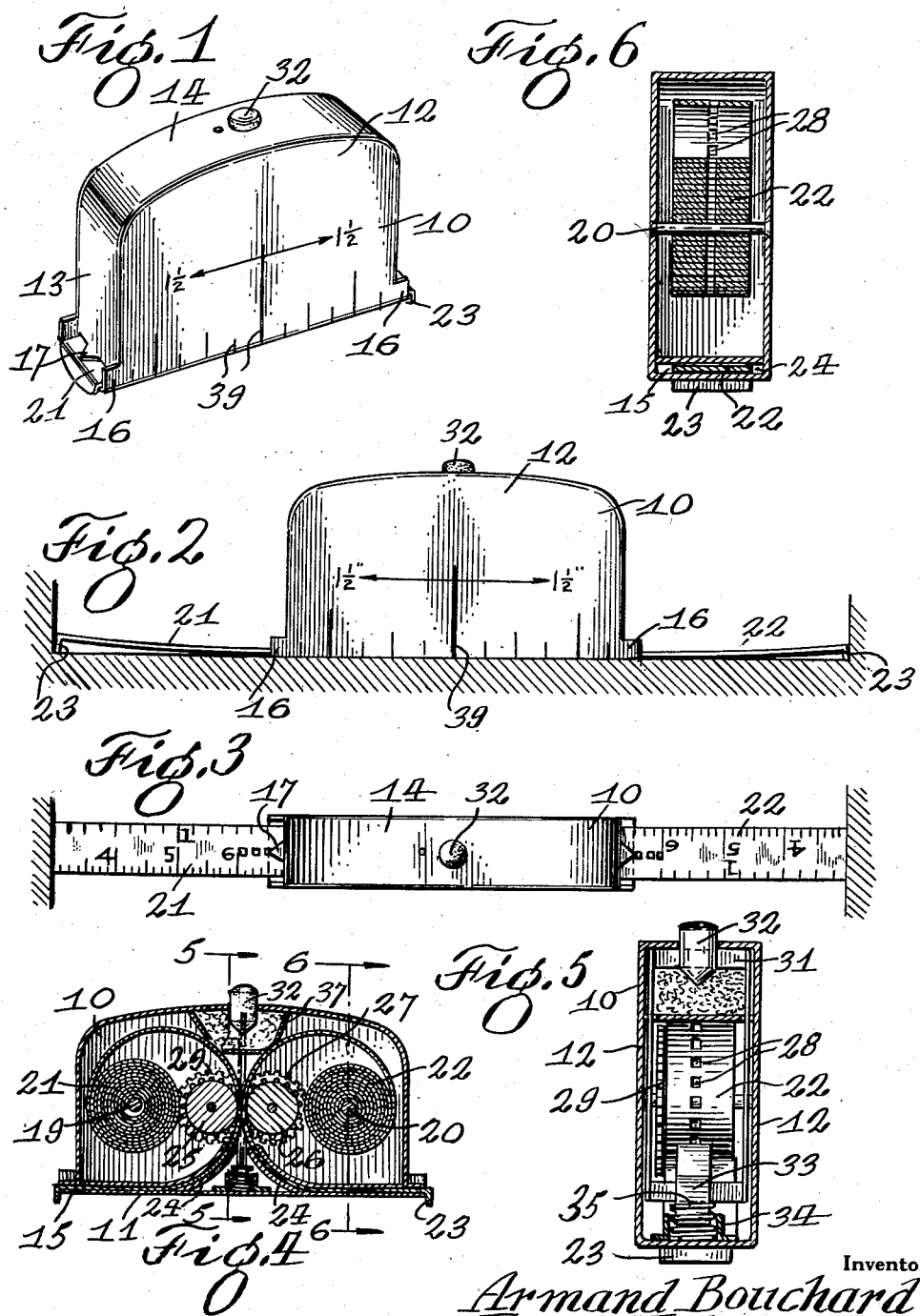
Inventor
Armand Bouchard
Joseph V. Tremblay
By
Attorneys Patented May 6, 1941

2,240,753

UNITED STATES PATENT OFFICE 2,240,753

MEASURING DEVICE

Armand Bouchard and Joseph V. Tremblay, St. Joseph d'Alma, Quebec, Canada

Application April 12, 1940, Serial No. 329,391

4 Claims. (Cl. 33—138)

The present invention relates to improvements in measuring devices.

An object of the invention is the provision of a measuring device of generally improved construction.

Another object of the invention is the provision of a measuring device designed to engage an object to be measured.

A further object of the invention is the provision of a measuring device which embodies a plurality of oppositely extensible rules.

Still another object of the invention is the provision of a measuring device having rules which are disposed to move simultaneously and uniformly.

Other objects and advantages of the invention will become apparent as the description progresses.

In the accompanying drawing forming a part of this specification and in which like reference characters are employed to designate corresponding parts throughout the same—

Figure 1 is a perspective view of the improved measuring device with the rules in retracted position, Figure 2 is a side elevational view of the same with the rules shown in measuring position, Figure 3 is a top plan view of the same, Figure 4 is a vertical longitudinal section through the device, Figure 5 is a transverse section taken on the line 5—5 of Figure 4, and Figure 6 is a transverse section taken on the line 6—6 of Figure 4.

Referring to the drawing, wherein for the purpose of illustration is shown a preferred embodiment of the invention, 10 generally designates the casing of the device, preferably in the form of a rigid, elongated casing structure having a flat elongated bottom 11, flat opposed sides 12, relatively narrow vertical end walls 13 and a rounded top 14. In the bottom part of the opposed end walls 13 are provided elongated slots 15 in registration with channel-shaped guide projections 16. At the top edge portion of the end slot 15 is formed a longitudinally projecting tapered pointer 17.

At longitudinally spaced positions within the casing 10 are mounted a pair of rigid shafts 19 and 20, extending transversely of the casing and having fastened thereto the inner ends of a pair of rule forming strips 21 and 22 formed of metal or the like. These rules are preferably of resilient construction and formed so that they have an inherent tendency to assume a tightly coiled state about the respective shafts 19 and 20. The rules are arranged so that a portion is looped from each coil to form an arc directed toward the centre of the casing and trained through a curved guide-channel 24 mounted at the lower intermediate portion in each side section of the casing, so that the outer portion of the rule projects through the end outlet slot 15 and protrudes beyond the end of the casing. At the outer end portion, each of the rules is formed with a right angular downwardly directed projection or lip 23, the purpose of which will be hereinafter described.

Mounted transversely at the centre portion of the casing, in parallel closely spaced arrangement, are a pair of rotary drums 25 and 26, each having radially projecting sprockets or teeth 27 arranged circumferentially about the intermediate portion, adapted for engagement with openings 28 arranged in a longitudinal row along the centre-line of the rule forming strips 21 and 22. At one end of each of the drums 25 and 26 is secured a spur gear 29, the two gears being assembled to intermesh so that the drums will be connected to rotate simultaneously and in opposite directions. As shown to advantage at Figure 4, the open loop extensions of the respective resilient rules are arranged so that they are trained over the inner portions of the two drums, so that the rule strips are thus associated with the drums.

Mounted vertically at the centre portion of the casing is a rectangular shaped frame 31 having the cross bar at the top extending through and connected with a plunger 32, slidably mounted in an opening in the casing top 14. The bottom cross bar of the frame is extended through an aperture in a vertically arranged stem 33 tapered to a wedge formation at the top. The lower portion of the stem is slidably fitted in a socket 34 and is surrounded by a coiled spring 35. This frame acts to yieldingly maintain the frame in elevated position so that the upper wedge portion of the stem 33 is pressed between the adjacent parts of the rule loops to lock the rules against normal winding movement. As the frame is elevated, the member 32 is raised to a position so that the upper portion protrudes well above the top of the casing to form an actuating button.

In the top of the casing is also provided a receptacle 37 designed to hold lubricant or waste matter soaked with lubricant so as to maintain the operative mechanism properly lubricated at all times.

This device is useful for many purposes and can be most advantageously employed for the external as well as internal measurement of objects. Thus, when measuring the length of an object having end edges, the lip 23 on the respective rules may be readily arranged to overhang and grip such edges for accurate determination of the measurement. To determine the measurement of a length between two end pieces, as for instance the interior dimension of a structure such as a window frame, as shown at Figures 2 and 3, the user initially depresses the button extension 32 to release the locking stem, enabling the rules to be extended as required. By engaging and extending one rule, the complementary rule is, through the medium of the drums and gears, simultaneously extended to an exactly corresponding degree. Therefore, by holding the casing in one hand and pulling one rule outwardly with the other, both ends of the respective rules may be disposed upon the bottom member of the frame to points abutting the opposed side members. To expedite the designation of the measurement each rule is graduated so that the dimensions indicated thereon are actually one-half of the represented value and the designating numerals are calculated so as to deduct therefrom the length of the casing, so that the reading on either extended rule furnishes a dimension including the actual length of the extended portions of the two rules and the length of the casing. Also, each side wall 12 of the casing is, at the bottom margin, graduated as indicated at 39, in correspondence with graduations of the rule, having a prolonged central graduation which furnishes an accurate centre point of the length of the casing as well as between the extended ends of the rules. At the same time, each of the rules may be graduated and marked to designate a full scale conventional measurement.

Thus, this measuring device has many advantages in that it may be employed to quickly determine the full length between any two given points, to obtain the accurate centre position between such points, and for direct full scale measurement of relatively small objects.

It is to be understood that the form of our invention herein shown and described is to be taken as a preferred example of the same, and that various changes as to the shape, size and arrangement of parts may be resorted to without departing from the spirit of the invention or the scope of the subjoined claims.

Having thus described our invention, we claim:

1. In a measuring device, a casing, a pair of complementary rules mounted in spaced relation in the casing and adapted to assume coiled arrangement therein, and means connecting the said rules whereby extension of one rule will cause corresponding extension of the other.

2. In a measuring device, a casing, a pair of complementary rules mounted in spaced relation in the casing and adapted to assume coiled arrangement therein, the said rules being formed to inherently tend to assume a coiled formation, gear means in the casing engageable with the said complementary rules whereby to cause simultaneous and uniform extension of the rules, and means for selectively locking the rules in set position.

3. In a measuring device, a casing, a pair of complementary rules mounted in spaced relation in the casing and adapted to assume coiled arrangement therein, the said rules being formed to inherently tend to assume a coiled formation, gear means in the casing engageable with the said complementary rules whereby to cause simultaneous and uniform extension of the rules, a device operable to lock the said rules in set position, and spring means yieldingly urging said locking means into locking position.

4. In a measuring device, an elongated casing, a pair of normally coiled rules secured in opposite parts of the casing, the said rules being extensible through openings in opposite end portions of the casing, a pair of toothed drums rotatably mounted in the casing having positive connection with the respective rules, so as to cause simultaneous movement of the said rules, manually operable means for locking the rules in selected position, and spring means yielding tending to actuate the locking means to rule locking position.

ARMAND BOUCHARD.
JOSEPH VICTORIEN TREMBLAY.